(12) United States Patent
Kitamura (10) Patent No.: US 7,309,306 B2
(45) Date of Patent: Dec. 18, 2007

(54) MACHINE TOOL

(75) Inventor: Akihiro Kitamura, Takaoka (JP)

(73) Assignee: Kitamura Machinery Co., Ltd. (JP)

( * ) Notice: Subject to any disclaimer, the term of this patent is extended or adjusted under 35 U.S.C. 154(b) by 0 days.

(21) Appl. No.: 11/599,379

(22) Filed: Nov. 15, 2006

(65) Prior Publication Data

US 2007/0123403 A1 May 31, 2007

(30) Foreign Application Priority Data

Nov. 25, 2005 (JP) .............................. 2005-009934

(51) Int. Cl.
*B23Q 3/157* (2006.01)
*G06F 19/00* (2006.01)

(52) U.S. Cl. ........................... 483/10; 483/16; 483/28; 700/179

(58) Field of Classification Search ................. 483/10, 483/11, 16, 17, 28, 30; 700/7, 9, 18, 95, 700/96, 169, 173, 174, 175, 177, 178, 179, 700/180, 181, 182, 183, 184; 707/1, 104.1; 708/130; 709/217; 409/235
See application file for complete search history.

(56) References Cited

U.S. PATENT DOCUMENTS

| | | | | |
|---|---|---|---|---|
| 4,138,718 A | * | 2/1979 | Toke et al. | 700/7 |
| 4,281,379 A | * | 7/1981 | Austin | 700/3 |
| 4,510,565 A | * | 4/1985 | Dummermuth | 700/7 |
| 5,815,400 A | * | 9/1998 | Hirai et al. | 700/173 |
| 5,984,503 A | * | 11/1999 | Strickland et al. | 700/95 |
| 6,112,133 A | * | 8/2000 | Fishman | 700/182 |
| 6,975,913 B2 | * | 12/2005 | Kreidler et al. | 700/96 |
| 2003/0014387 A1 | * | 1/2003 | Kreidler et al. | 707/1 |
| 2003/0014498 A1 | * | 1/2003 | Kreidler et al. | 709/217 |
| 2006/0010006 A1 | * | 1/2006 | Kreidler et al. | 705/1 |
| 2006/0106616 A1 | * | 5/2006 | Ohashi et al. | 704/275 |
| 2007/0050079 A1 | * | 3/2007 | Itoh et al. | 700/179 |

* cited by examiner

*Primary Examiner*—Dana Ross
(74) *Attorney, Agent, or Firm*—Bacon & Thomas, PLLC (57) ABSTRACT

A machine tool comprises a main body having a plurality of parts and an NC apparatus connected to the main body. The NC apparatus includes a display means for displaying a part information about the plurality of parts constituting the main body, a memory means for memorizing the part information, and a control means for controlling the display means and the memory means. The part information includes the ID number, names, types and attachment positions of the parts. The control means displays either the ID numbers and the attachment positions of the parts or the ID numbers, the names, and the types of the parts on the display means selectively.

18 Claims, 10 Drawing Sheets

| NO. | NAME | MODEL |
|---|---|---|
| 2 | speed reducer bracket | 2-P89915#1 |
| 3 | cyclone speed reducer | CNFX-6895-LB-21 |
| 4 | servomotor | β-2/3000 |
| 5 | hexagon socket head cap screw | M8×20 |
| 7 | collar | 4-P29306#1 |
| 8 | sprocket | 4-P29305#1 |
| 10 | hexagon socket head cap screw | M10×35 |
| 12 | hexagon socket head cap screw | M8×60 |
| 14 | hexagon nut | M8用 |
| 14 | hexagon nut (for M8) | M8 |
| 15 | roller chain | 4-P24851#1 |
| 15 | body | RS40 |
| 16 | positioning block | 3-P13522#1 |
| 17 | hexagon socket head cap screw | M12×40 |
| 19 | parallel key (20*12*65) | 4-P14634#1 |
| 20 | hexagon socket head cap screw | M6×15 |
| 22 | hexagon socket set screw | M10×45 |
| 24 | hexagon nut | M10 |
| 25 | washer | 4-P25861#1 |
| 27 | female screw taper pin | φ8×40 |

PUSH KEY

| display part | | | | | redisplay | | break | return to list | |

MACHINE TOOL

FIELD OF THE INVENTION

The present invention relates to a machine tool which comprises a main body and an NC apparatus connected to the main body, wherein the main body has a plurality of parts.

RELATED ART

When a part of a machine tool is exchanged as a result of trouble in the machine tool, a user checks the part to be exchanged by looking over a part list (list of the parts) shown in a manual of the machine tool.

However, in some machine tools, such a part list is not attached. In this case, the user of the machine tool cannot easily exchange the part immediately, which causes prolongation of idle time of the machine.

SUMMARY OF THE INVENTION

The object of the present invention is to provide a machine tool, which allows the user to easily check attachment positions, types, and names of the parts so as to shorten the time required for exchanging the parts.

According to a preferred mode of the present invention, a machine tool comprises a main body (12, 42) having a plurality of parts (22, 52) and an NC apparatus (14, 44) connected to the main body (12, 42).

The NC apparatus (14, 44) includes a display means (16, 46) for displaying a part information about the plurality of parts (22, 52) constituting the main body (12, 42), a memory means (18, 48) for memorizing the part information, and a control means (20, 50) for controlling the display means (16, 46) and the memory means (18, 48).

The part information includes ID numbers (26, 56), names (28, 50), types (30, 60), and attachment positions (32, 62) of the parts.

The control means (20, 50) displays either the ID numbers (26, 56) and the attachment positions (32, 52) of the parts or the ID numbers (26, 56), the names (28, 58), and the types (30, 60) of the parts on the display means (16, 46), selectively.

Preferably, a detecting means (64) is connected to the main body (42) for detecting a trouble of the main body (42).

It is preferable that the control means (50) controls the display means (46) and the memory means (48) when some trouble of the main body (42) is detected by the detecting means (64), If the trouble occurs in the main body (42), the control means (50) reads the part information of the part (52) about the trouble from the memory means (48) and displays it on the display means (46).

According to the present invention, the user can check the ID number and the attachment position of the part, and then, the user can check the name and the type of the part corresponding to the checked ID number of the part. Thus, the user can easily check the attachment position, the name, and the type of the part to be exchanged. An idle time of the machine tool can be reduced. In other words, the user on the spot can check, prepare, and exchange the defective part, which leads to reducing of the idle time of the machine.

Thus, even if the trouble occurs in the main body, the idle time of the machine tool can be further reduced, because the user can easily check the parts information for the part which is the source of the trouble.

The machine tool in the best mode according to the present invention comprises a main body and an NC apparatus connected to the main body. The main body has a plurality of parts. The NC apparatus includes a display means, a memory means, and a control means. The display means displays a part information about the plurality of parts constituting the main body. The memory means memorizes the part information. The control means controls the display means and the memory means. The part information includes ID numbers, names, types, and attachment positions of the parts. The control means displays either the ID numbers and the attachment positions of the parts or the ID numbers, the names, and the types of the parts on the display means selectively.

In a machine tool of the present invention, each of the plurality of parts constituting the main body may be a speed reducer bracket, cyclone speed reducer, servomotor, hexagon socket head cap screw, collar, sprocket, hexagon nut, roller chain, positioning block, parallel key, hexagon socket set screw, washer, female screw taper pin, etc.

In a machine tool of the present invention, the part information includes the ID numbers, the names, the types, and the attachment positions of the parts. Preferably, the part information may further include storage locations or the total number of the parts.

In a machine tool of the present invention, various numerical values may be used as the ID characters of the parts to distinguish the parts from each other. If the attachment positions of the parts are shown in the figures, ID numbers shown in the figures may be used as the ID characters of the parts.

In a machine tool of the present invention, common names of the parts can be used for the names of the parts, so that the user can easily understand the names of the parts. If the name of the part becomes the same as the name of the other part, a position or a serial number of the part may be used in combination with the common name.

In a machine tool of the present invention, model numbers or sizes of the parts may be included in the types of the parts.

In a machine tool of the present invention, an exploded perspective view or an exploded side view of an area where the part is attached may be used to show the attachment positions of the parts. Otherwise, in the present invention, the attachment positions may be shown in letters or in a combination of letters and figures.

Preferably, the machine tool has a detecting means connected to the main body for detecting a trouble of the main body. The control means controls the display means and the memory means on the basis of the trouble of the main body which is detected by the detecting means. If the trouble occurs in the main body, the control means reads the part information of the part about the trouble from the memory means and displays it on the display means.

In a machine tool of the present invention, preferably, the detecting means is connected to various assemblies constituting the main body. In this case, the plurality of parts constitute each assembly. Each of the assemblies may be a body, main spindle, X-axis feeder, Y-axis feeder, Z-axis feeder, X-axis limit switch, Y-axis limit switch, Z-axis limit switch, Z-axis cable bearer, X-axis slide cover, X-axis motor cover, whole cover, tip conveyer, machining oil tank, ATC, operation panel, control panel, etc., for example.

In a machine tool of the present invention, the trouble of the main body typically means the case in which the part must be exchanged as a result of abrasion, deformation, breakage, etc. of the part. However, the present invention is not limited to such a case. The trouble includes various cases that interrupt the operation of the main body.

Thus, a machining tool according to the present invention can have a function to display all the attachment positions, the types, and the names of the parts constituting the machining tool on the display means of the NC apparatus provided on the machine tool.

DESCRIPTION OF THE PREFERRED EMBODIMENTS

Embodiment 1

Embodiment 1 of the present invention will be described with reference to the drawings.

Figure 1:
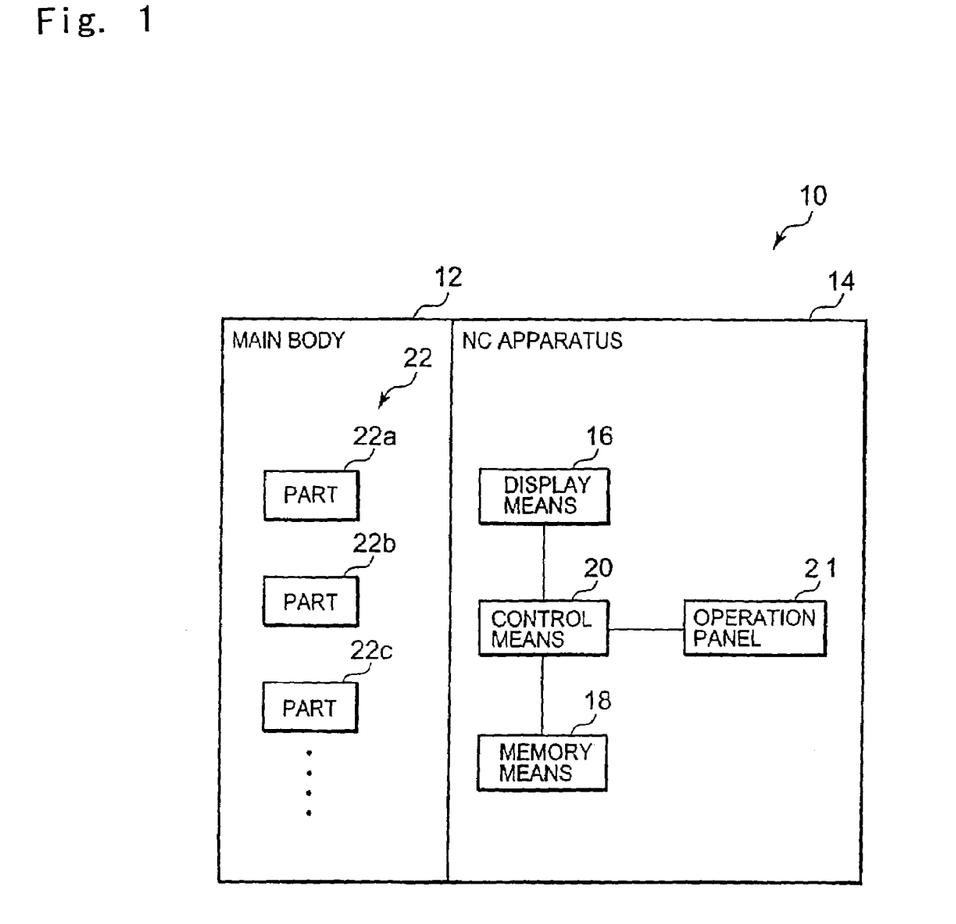
FIG. 1 is a schematic diagram of one embodiment of a machine tool according to the present invention.

FIG. 1 is a schematic diagram of a machine tool according to the embodiment 1 of the present invention.

A machining tool 10 has a main body 12 and an NC apparatus 14. The main body 12 has a plurality of parts 22. The NC apparatus 14 is connected to the main body 12.

The NC apparatus 14 has a display means 16, a memory means 18, a control means 20, and an operation panel 21.

The display means 16 displays part information about the plurality of parts 22 constituting the main body 12.

The memory means 18 is formed of a conventional means for memorizing the part information.

The main body 12 comprises the plurality of parts 22. The plurality of parts 22 consist of a part 22a, 22b, 22c - - - .

The control means 20 controls the display means 16 and the memory means 18. The control means 20 controls the display means 16 and the memory means 18 by means of the operation panel 21.

The part information includes ID numbers 26, names 28, types 30, and attachment positions 32 of the parts.

The control means 20 displays either the ID numbers 26 and the attachment positions 32 or the ID numbers 26, the names 28, and the types 30 of the parts on the display means 16 selectively.

FIG. 2 to FIG. 7 show an example of contents displayed on the display means.

Figure 2:
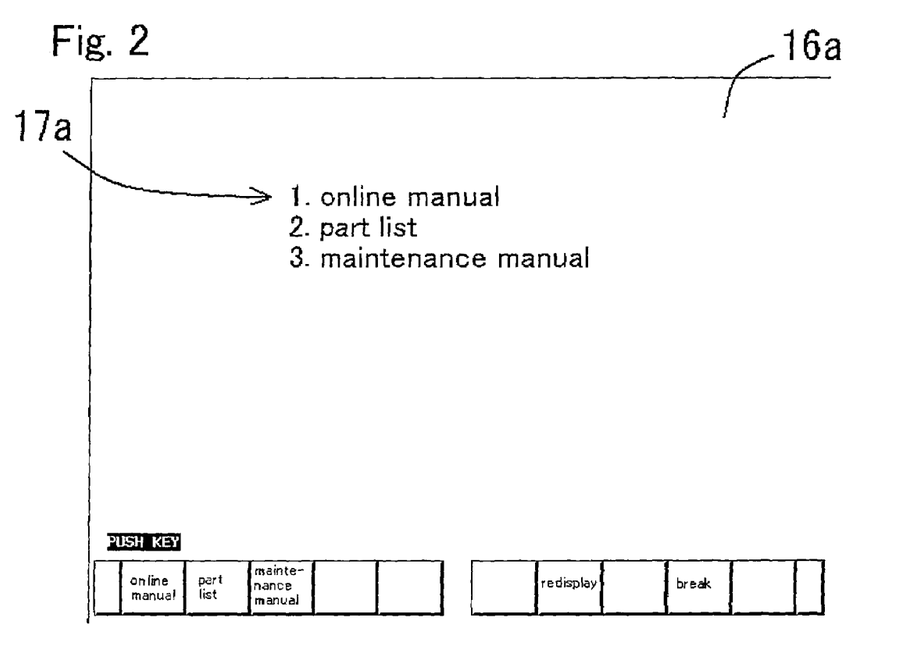
FIG. 2 shows a screen for selecting an item of "part list"

FIG. 2 shows a screen for selecting an item of "2. part list".

Figure 3:
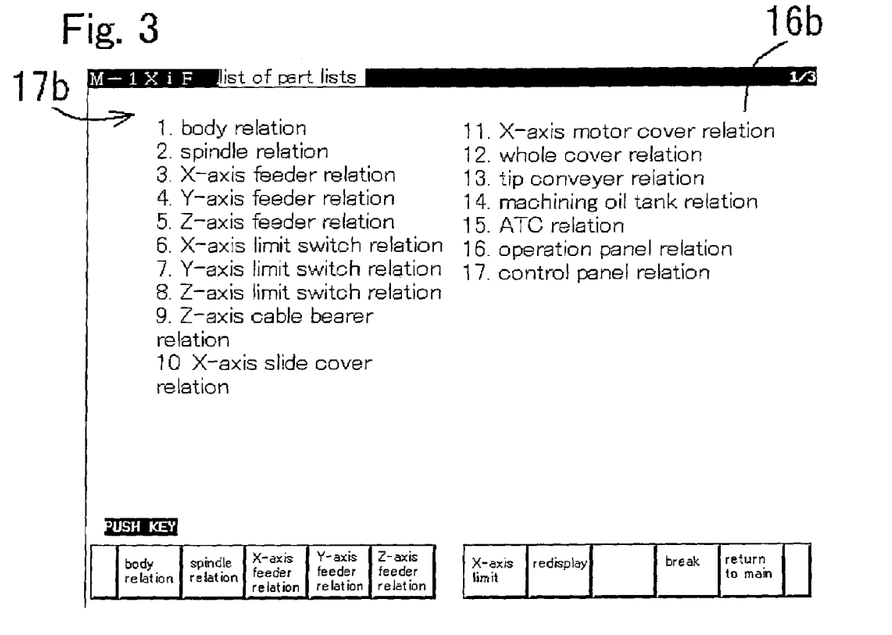
FIG. 3 shows a list of part lists.

If the user selects an item 17a of "2. part list" in the middle area of display contents 16a of the display means by means of a soft key (not shown) provided on the operation panel 21, display contents 16b shown in FIG. 3 are displayed.

FIG. 3 shows a list of the part lists.

The part lists are sorted by assemblies (devices) constituting the main body 12. By means of a page-up-down key not shown in the figure, a menu aligned at the lower side of the display contents 16b can be changed. For example, if an item 17b of "1. body relation" is selected as an assembly by means of the soft key, display contents 16c shown in FIG. 4 are displayed.

Figure 4:
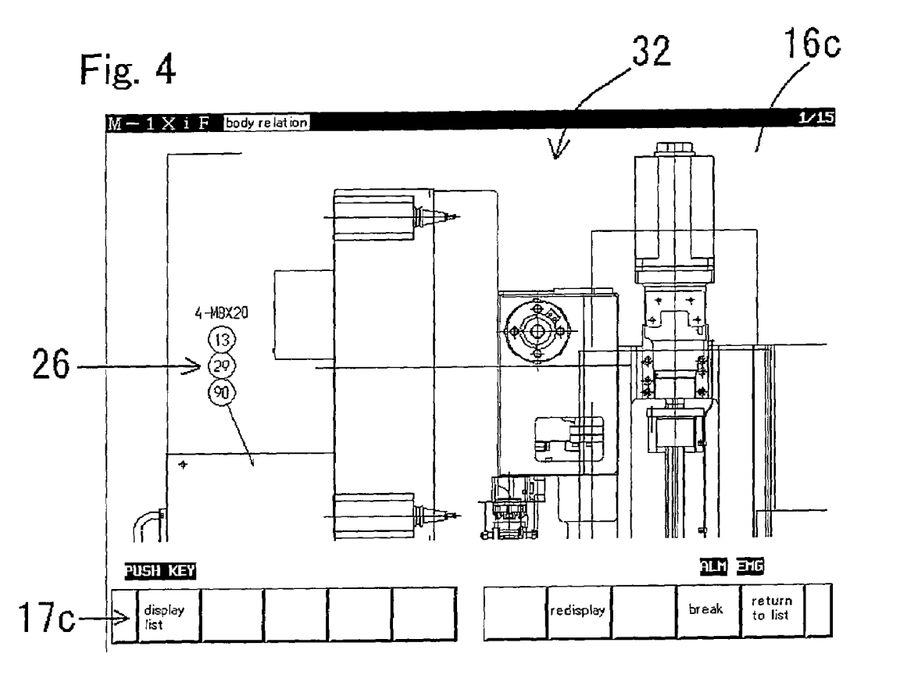
FIG. 4 shows ID numbers and attachment positions of parts about "body relation"

FIG. 4 shows ID numbers and attachment positions of the parts about "body relation". Circled numerical values 13, 29, and 90 are shown as the ID numbers 26 of the parts. A schematic cross sectional side view about "body relation" is used for showing the attachment positions 32 of the parts. By scrolling the display contents 16c upwards, display contents 16d shown in FIG. 5 are displayed.

Figure 5:
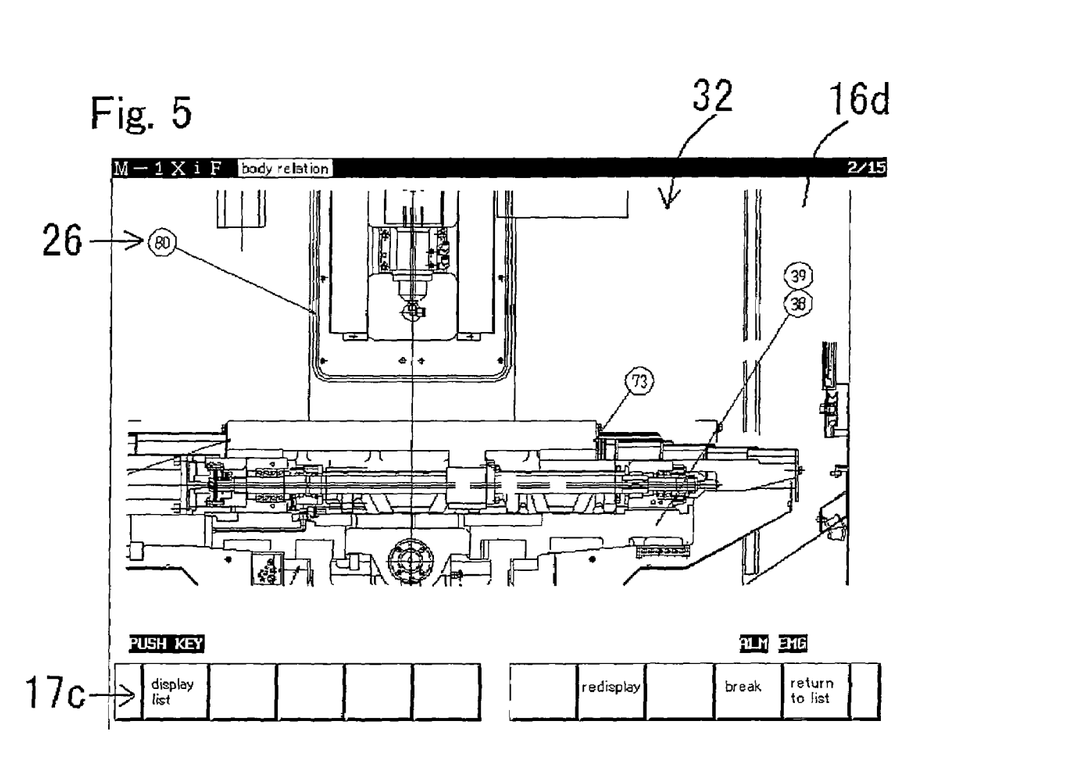
FIG. 5 is a side view at a lower side about "body relation"

FIG. 5 is a side view at a lower side about "body relation". In FIG. 5, a circled numerical value 80 etc. are shown as the ID number 26 of the part.

Figure 6:
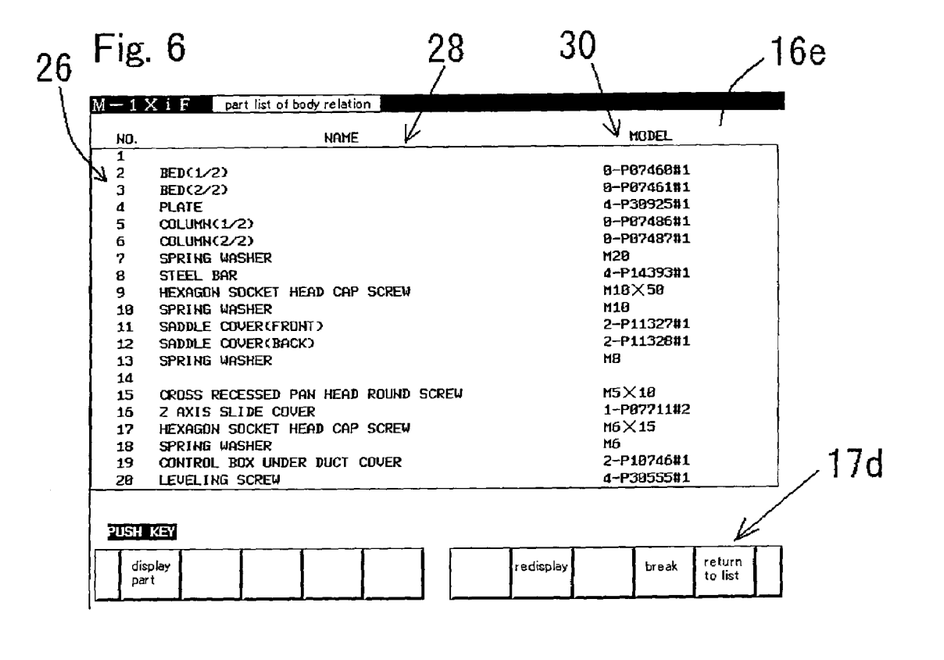
FIG. 6 shows contents of the part list (list of the parts) of "body relation"

In FIG. 4 and FIG. 5, if an item 17c of "display list" is selected by means of the soft key, display contents 16e shown in FIG. 6 are displayed.

FIG. 6 shows contents of the part list (list of the parts) of "body relation". Part numbers (numbers in the figures) are shown as the ID numbers 26 of the parts from NO. 1 to 20. On the right side of the ID numbers 26 of the parts, corresponding names 28 and types 30 of the parts are shown in columns of NAME and MODEL, respectively.

Figure 7:
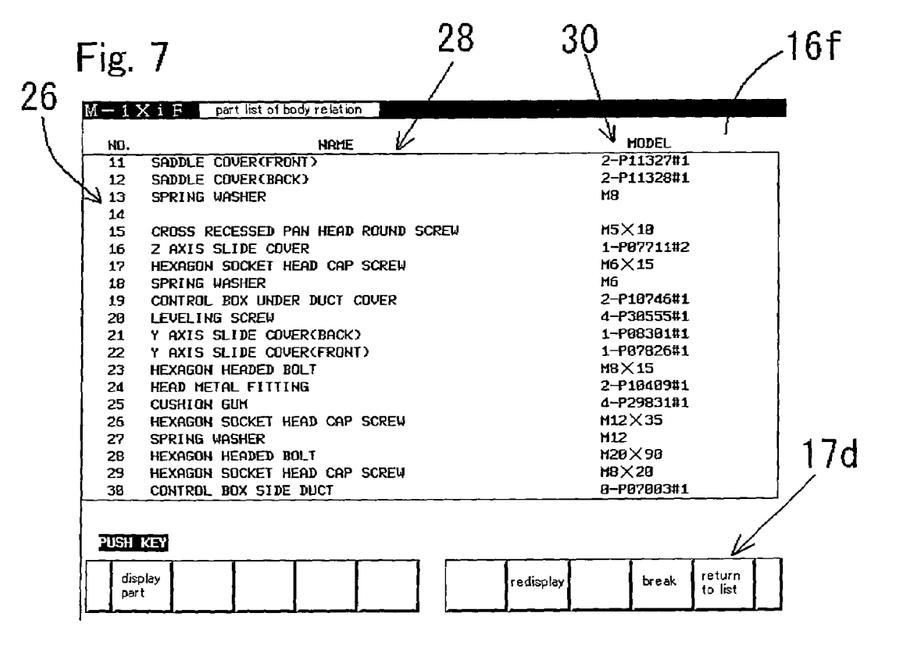
FIG. 7 shows contents of the part list (list of the parts) of "body relation"

In FIG. 6, if the display contents 16e are scrolled upwards, display contents 16f shown in FIG. 7 are displayed.

FIG. 7 shows contents of the part list (list of the parts) of "body relation". In FIG. 7, display contents after NO. 20 are further displayed. In FIG. 6 and FIG. 7, by selecting an item 17d of "return to list", the screen returns to the selection screen of the assembly shown in FIG. 3.

An example of a process to display the part information about the parts of "body relation" on the display means will be described.

In FIG. 2, the user selects the item 17a of "2. part list" by means of the soft key. In FIG. 3, the user selects the item 17b of "1. body relation". By looking over the display contents shown in FIG. 4 and FIG. 5, the user checks the ID number 26 and the attachment position 32 of the part. The user selects the item 17c of "display list". By looking over the display contents shown in FIG. 6 and FIG. 7, the user checks the name 28 and the type 30 of the part corresponding to the ID number 26 of the part.

Thus, on the basis of the ID number 26 of the part, the user can easily check the attachment position 32, the name 28, and the type 30 of the part.

Embodiment 2

Embodiment 2 of the present invention will be described with reference to the drawings.

Figure 8:
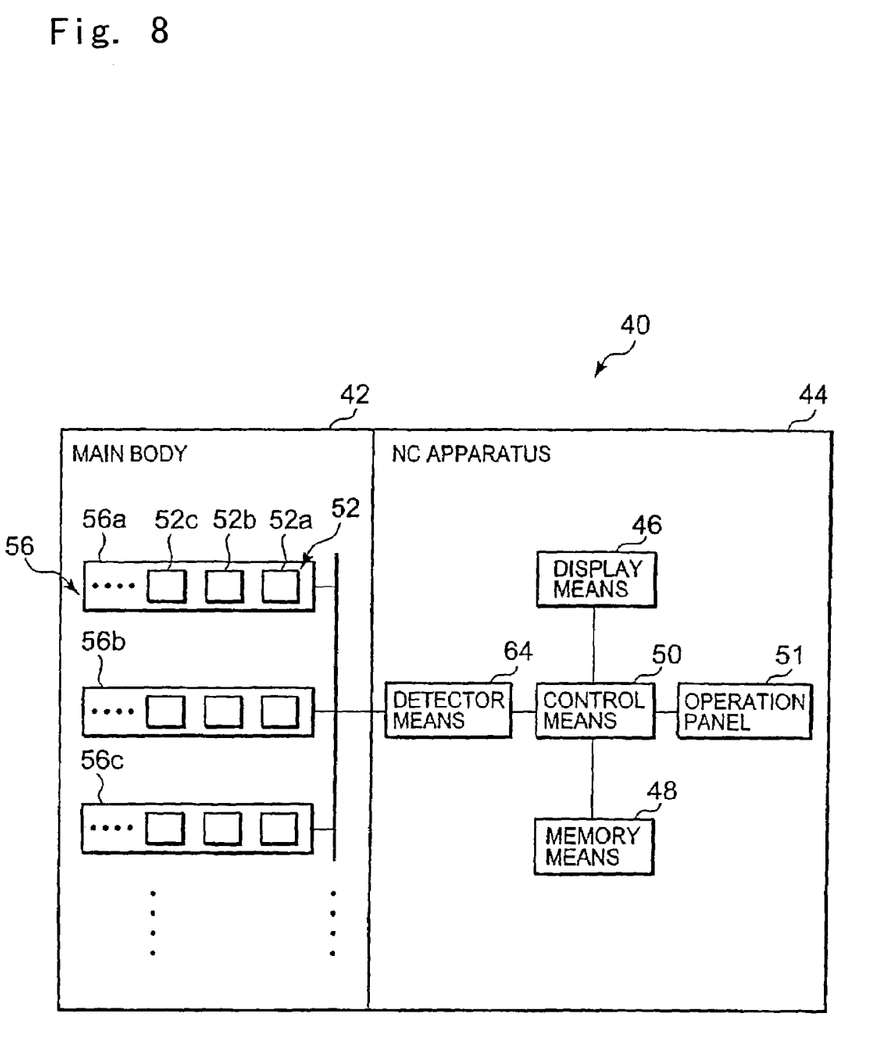
FIG. 8 is a schematic diagram of another embodiment of a machine tool according to the present invention.

FIG. 8 is a schematic diagram of a machine tool according to the embodiment 2 of the present invention.

A machining tool 40 has a main body 42 and an NC apparatus 44. The main body 42 has a plurality of parts 52. The NC apparatus 44 is connected to the main body 42.

The NC apparatus 44 has a display means 46, a memory means 48, a control means 50, and an operation panel 51.

The display means 46 displays part information about the plurality of parts 52 constituting the main body 42.

The memory means 48 is formed of a conventional means for memorizing the part information.

The main body 42 comprises a plurality of assemblies 56. The plurality of assemblies 56 consist of an assembly 56a, 56b, 56c,. In this case, each of the plurality of assemblies 56a, 56b, 56c, consists of a plurality of parts 52.

Additionally, the machining tool 40 has a detecting means 64. The detecting means 64 is connected to the plurality of assemblies 56 for detecting troubles of the assemblies 56.

The control means 50 controls the display means 46 and the memory means 48. The control means 50 controls the display means 46 and the memory means 48 on the basis of the troubles of the main body 42 which are detected by the detecting means 64.

The part information includes ID numbers 56, names 58, types 60, and attachment positions 62 of the parts.

The control means 50 displays either the ID numbers 56 and the attachment positions 62 or the ID numbers 56, the names 58, and the types 60 of the parts on the display means 46 selectively. If a trouble occurs in the assemblies 56, the control means 50 reads the part information about the part 52 from the memory means 48 to display it on the display means 46.

Figure 9:
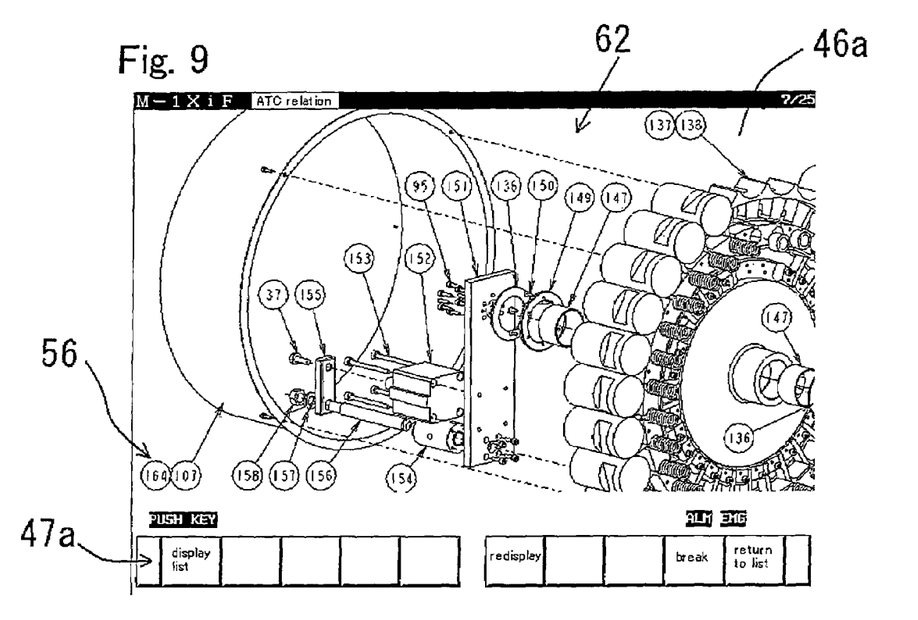
FIG. 9 shows ID numbers and attachment positions of the parts about "ATC relation"
Figure 10:
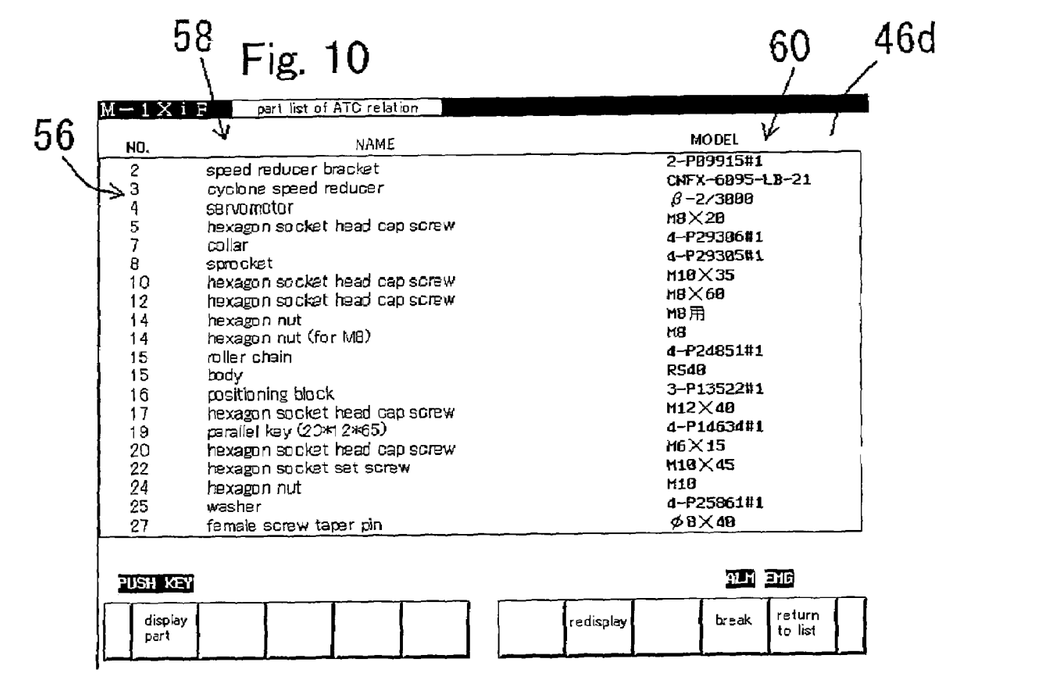
FIG. 10 shows contents of the part list (list of the parts) of "ATC relation".

FIG. 9 and FIG. 10 are one example of display contents 46a, 46d displayed on the display means, respectively.

FIG. 9 shows ID numbers and attachment positions of the parts about "ATC relation". Circled numerical values 164, 107 etc. are shown as the ID numbers 56 of the parts. A schematic exploded perspective view about "ATC relation" is used for showing the attachment positions 62 of the parts.

In FIG. 9, if an item 47a of "display list" is selected by means of a soft key (not shown) provided on the operation panel 51, the display contents 46d shown in FIG. 10 are displayed.

FIG. 10 shows contents of the part list (list of the parts) of "ATC relation". Part numbers (numbers in the figure) are shown as the ID numbers 56 of the parts from NO. 2 to 27. On the right side of the ID numbers 56 of the parts, corresponding names 58 and types 60 of the parts are shown in alignment with each other.

An example of a process to display the part information about the parts of "ATC relation" on the display means will be described.

If a trouble occurs in one of the assemblies 56, the detecting means 64 detects the trouble of the assembly 56. The control means 50 controls the display means 46 and the memory means 48 on the basis of the trouble of the main body 42 which is detected by the detecting means 64. In this case, the control means 50 reads the ID number 56 and the attachment position 62 of the part about the trouble from the memory means 48 and display them as shown in FIG. 9. The user looks over the display contents 46a shown in FIG. 9 and checks the ID number 56 and the attachment position 62 of the part. Next, the user looks over the display contents 46d shown in FIG. 10 and checks the name 58 and the type 60 of the part corresponding to the ID number 56 of the part. Thus, on the basis of the ID number 56 of the part, the user can easily check the attachment position 62, the name 58, and the type 60 of the part.

The present invention is not limited to the above-stated embodiments.

What is claimed is:

1. A machine tool comprising a main body (12, 42) having a plurality of parts (22, 52) and an NC apparatus (14, 44) connected to the main body (12, 42), the NC apparatus (14, 44) including:

a display means (16, 46) for displaying parts information for the plurality of parts (22, 52) constituting the main body (12, 42),     a memory means (18, 48) for storing the parts information, wherein the parts information includes ID characters (26, 56), names (28, 50), types (30, 60), and attachment positions (32, 62) of the parts, and     a control means (20, 50) for controlling the display means (16, 46) and the memory means (18, 48) to cause the display means to selectively display (1) a screen presenting a view of an area of the main body showing parts the ID characters (26, 56) of the parts and the attachment positions (32, 52) of the parts and (2) a screen presenting a listing of the ID characters (26, 56), the names (28, 58), and the types (30, 60) of the parts.

2. a machine tool according to claim 1, further comprising detecting means (64), connected to the main body (42), for detecting trouble within the main body (42), and wherein the control means (50) controls the display means (46) and the memory means (48) on the basis of the detected trouble within the main body (42) which is detected by the detecting means (64), and reads the parts information for the part (52) which is the source of the trouble from the memory means (48) and displays the read parts information on the display means (46).

3. A machine tool according to claim 1, wherein the attachment positions are shown in a combination of letters and figures.

4. A machine tool according to claim 1, wherein the view is an exploded view of an assembly of the plurality of parts.

5. A machine tool according to claim 4 wherein the view is a perspective view.

6. A machine tool according to claim 1 wherein the view is a perspective view.

7. A machine tool according to claim 1 wherein the characters are numerals.

8. A machine tool according to claim 2 wherein the characters are numerals.

9. A machine tool according to claim 3 wherein the characters are numerals.

10. A machine tool according to claim 4 wherein the characters are numerals.

11. A machine tool according to claim 5 wherein the characters are numerals.

12. A machine tool according to claim 6 wherein the characters are numerals.

13. A machine tool according to claim 1 wherein the screens (1) and (2) are displayed in succession.

14. A machine tool according to claim 2 wherein the screens (1) and (2) are displayed in succession.

15. A machine tool according to claim 3 wherein the screens (1) and (2) are displayed in succession.

16. A machine tool according to claim 4 wherein the screens (1) and (2) are displayed in succession.

17. A machine tool according to claim 5 wherein the screens (1) and (2) are displayed in succession.

18. A machine tool according to claim 6 wherein the screens (1) and (2) are displayed in succession.

* * * * *